(12) United States Patent
Awada et al.

(10) Patent No.: US 7,437,678 B2
(45) Date of Patent: Oct. 14, 2008

(54) MAXIMIZING WINDOW DISPLAY AREA USING WINDOW FLOWING

(75) Inventors: Faisal M. Awada, Round Rock, TX (US); Joe Nathan Brown, Austin, TX (US); Philip Bernard Burkes, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 527 days.

(21) Appl. No.: 11/260,614

(22) Filed: Oct. 27, 2005

(65) Prior Publication Data

US 2007/0101289 A1 May 3, 2007

(51) Int. Cl.
G06F 3/048 (2006.01)
(52) U.S. Cl. ............... 715/784; 715/788; 715/790; 715/798; 715/799; 715/800
(58) Field of Classification Search .......... 715/781–809
See application file for complete search history.

(56) References Cited

U.S. PATENT DOCUMENTS

| | | | |
|---|---|---|---|
| 4,723,209 A | 2/1988 | Hernandez et al. | |
| 4,829,470 A | 5/1989 | Wang | |
| 5,060,170 A * | 10/1991 | Bourgeois et al. | 715/788 |
| 5,712,995 A * | 1/1998 | Cohn | 715/792 |
| 5,771,032 A * | 6/1998 | Cline et al. | 715/786 |
| 5,796,402 A * | 8/1998 | Ellison-Taylor | 715/792 |
| 5,920,315 A * | 7/1999 | Santos-Gomez | 715/792 |
| 6,031,530 A * | 2/2000 | Trueblood | 715/791 |
| 6,057,842 A * | 5/2000 | Knowlton et al. | 715/788 |
| 6,166,736 A * | 12/2000 | Hugh | 715/798 |
| 6,873,341 B1* | 3/2005 | Adams et al. | 345/629 |
| 2004/0125140 A1* | 7/2004 | Bell et al. | 345/765 |
| 2004/0189710 A1* | 9/2004 | Goulden et al. | 345/790 |
| 2005/0108655 A1* | 5/2005 | Andrea et al. | 715/798 |
| 2005/0125742 A1* | 6/2005 | Grotjohn et al. | 715/799 |

FOREIGN PATENT DOCUMENTS

EP 0 226 018 A2 6/1987

OTHER PUBLICATIONS

IBM Corporation, "Non-Rectangular Windows," IBM Technical Disclosure Bulletin, Feb. 1, 1995, p. 299, XP000502479, ISSN: 0018-8689, New York US.

IBM Corporation, PCT/EP2006/067877, International Search Report and Written Opinion, May 21, 2007, 17 pgs.

(Continued)

*Primary Examiner*—Tadeese Hailu
(74) *Attorney, Agent, or Firm*—Dillon & Yudell LLP

(57) ABSTRACT

A method, system, and a computer program product that enables a second window opened on a display screen to "flow" into and fill/occupy all available space within the displayable area of the display screen without overlapping a first window occupying less than the maximum width and/or length of the display area. A window flowing utility enables multiple windows to concurrently coexist and fill the maximum displayable area of the display screen. The window flowing utility determines which areas of the display screen are not currently being utilized by the first window, and allows the second window to occupy all of the available space remaining on the display device surrounding the first window.

1 Claim, 9 Drawing Sheets

OTHER PUBLICATIONS

Elliott, et al., Method to Include Audio Objects and Non-Text Objects in Text, IBM Technical Disclosure Bulletin, Dec. 1987, pp. 355-356, Austin, Texas, USA.

Barker, et al., Positioning of Nested or Included Object Presentation Spaces and Object Data, Feb. 1990, pp. 320-323, Dallas, Texas, USA.

Douglas, GL, Side Notes with Automatic Processing, Hidden Display, Fixed and Floating Notes and a Continuation Function, Feb. 1995, pp. 367-370, Dallas, Texas, USA.

* cited by examiner

MAXIMIZING WINDOW DISPLAY AREA USING WINDOW FLOWING

BACKGROUND OF THE INVENTION

1. Technical Field

The present invention rates generally to computer systems and in particular to the use of graphical windows within computer systems. Still more particularly the present invention relates to the orientation of graphical windows on a display device of a computer system.

2. Description of the Related Art

Conventional applications executing on a computer system utilizes a windowing functionality by which the user-viewable features of the application are displayed to the user in a rectangular-shaped graphical user interface (GUI), commonly referred to as a window. In the computer windowing environment, one or more windows may be open on a computer system at any given time. Each window may have different dimensions (height and width) which are adjustable by the user.

In traditional windowing environment, while users may have multiple windows displayed simultaneously when executing one or more application(s), the display mode of the background operating system (OS) is designed to allow the user to only interact with one current window (or file opened within the window) at a time, and thus the OS hides the previously opened windows "behind" the current window. As a result, there is only one window displayed on the display screen at one time.

Typically, however, windows either overlap each other or are adjacent to each other within the display area with their respective dimensions adjusted to enable the windows to be concurrently displayed on the limited space display device. Occasionally, also, the user desires to have one window designated as always being on top or viewable. This window may, for example, provide a video stream that is being watched by the user while working within another window. It is desirable to be able to maximize use of the viewable display space allocated to a second window when a first window, with dimensions smaller than the maximum display area, is designated to always be open and viewable.

A user is able to open multiple window displays and to view files within these windows by switching among windows. The user may open multiple window displays of different applications, or the user may open multiple files within a single application program, with each file being allocated a separate window. In conventional applications, in order to simultaneously view each file in each window, users have to manually select the OS option "arrange all" from the application program menu to automatically arrange all windows to be viewed simultaneously. Alternatively, the user manually modifies the boundaries of each the window displays to reduce the display area of each window and then manually arrange the windows to fit in one display screen. Depending on the OS being executed, the user may also view multiple window displays simultaneously by selecting the menu option "Tile," which enables selection of either horizontal or vertical tile viewing mode.

SUMMARY OF THE INVENTION

Disclosed are a method, system, and a computer program product that enables a second window opened on a display screen to "flow" into and fill/occupy available contiguous space within the displayable area of the display screen without overlapping a first window occupying less than the maximum width and/or length of the display area. A window flowing utility is provided that when executed by the computer processor, enables multiple windows to be concurrently displayed and fill the maximum displayable area of the display screen. The window flowing utility determines which areas of the display screen are not currently being utilized by the first window, and the window flowing utility allows the second window to occupy all of the contiguous available space remaining on the display device surrounding the first window.

In one embodiment, window flowing is implemented to maximize a window's useable area, under specific circumstances, including: (1) a first window is open that must always be visible (i.e., a persistent window); (2) the first window's vertical and/or horizontal dimension is a fraction of that of the maximum vertical and/or horizontal dimension of the display screen (and of the second window). That is, the first window is only a fraction of one or both of the maximum vertical and horizontal display dimensions; and (3) the windows are placed side by side or one above the other, with an overhanging area of the second window extending vertically or horizontally beyond one of the corresponding vertical or horizontal edges of first window, i.e., either over or below or adjacent to available contiguous space of the display screen that is not occupied by the first window.

The order of opening the windows is not particularly relevant to implementation of the invention. With window flowing functionality automatically enabled via the OS, the second window is automatically made to flow into the available contiguous space. However, in an alternate embodiment, window flowing is triggered by user selection (turning on) of that feature, and the existing display of windows may be then (dynamically or manually) reconfigured relative to each other to enable one or more of the windows to flow into existing contiguous space on the display screen.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and a computer program product that enables a second window opened on a display screen to "flow" into and fill/occupy available contiguous space within the displayable area of the display screen without overlapping a first window occupying less than the maximum width and/or length of the display area. A window flowing utility is provided that when executed by the computer processor, enables multiple windows to be concurrently displayed and fill the maximum displayable area of the display screen. The window flowing utility determines which areas of the display screen are not currently being utilized by the first window, and the window flowing utility allows the second window to occupy all of the contiguous available space remaining on the display device surrounding the first window.

In one embodiment, window flowing is implemented to maximize a window's useable area, under specific circumstances, including: (1) a first window is open that must always be visible (i.e., a persistent window); (2) the first window's vertical and/or horizontal dimension is a fraction of that of the maximum vertical and/or horizontal dimension of the display screen (and of the second window). That is, the first window is only a fraction of one or both of the maximum vertical and horizontal display dimensions; and (3) the windows are placed side by side or one above the other, with an overhanging area of the second window extending vertically or horizontally beyond one of the corresponding vertical or horizontal edges of first window, i.e., either over or below or adjacent to available contiguous space of the display screen that is not occupied by the first window.

The order of opening the windows is not particularly relevant to implementation of the invention. With window flowing functionality automatically enabled via the OS, the second window is automatically made to flow into the available contiguous space. However, in an alternate embodiment, window flowing is triggered by user selection (turning on) of that feature, and the existing display of windows may be then (dynamically or manually) reconfigured relative to each other to enable one or more of the windows to flow into existing contiguous space on the display screen.

Figure 4:
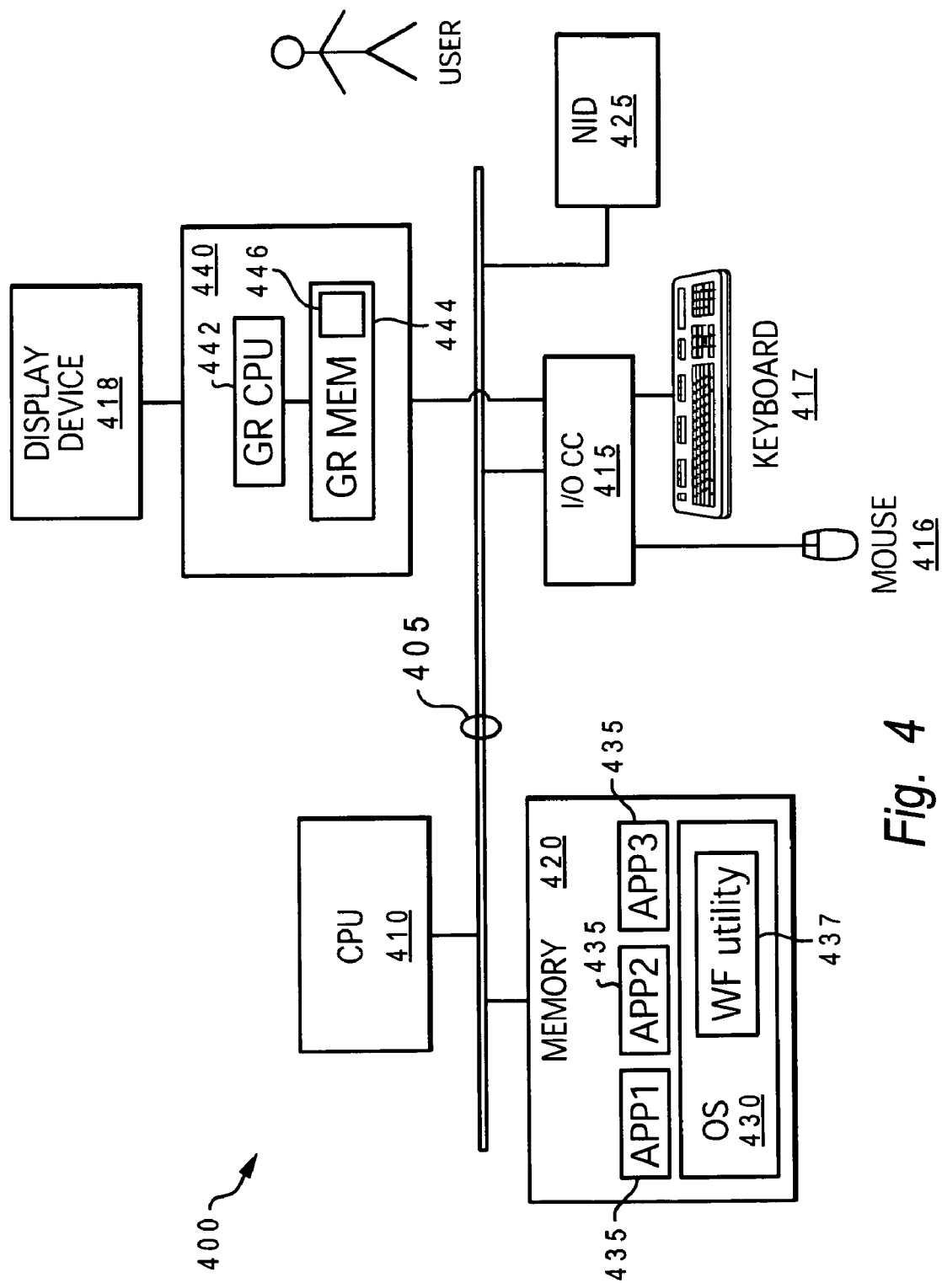
FIG. 4 is a block diagram representation of a data processing system within which the various features of the invention may be implemented.

With reference now to the figures, and in particular to a FIG. 4, there is illustrated a computer system within which features of the invention may advantageously be implemented. Computer system 100 comprises processor 410 coupled to memory 420 and input/output (I/O) controller 415 via a system bus 405. I/O controller 415 provides the connectivity to and/or control over input/output devices, including mouse 416, keyboard 417 and display device 418. Display device 418 may be one of a plurality of different types of display devices conventionally utilized by a computing device, and display device 418 provides a display screen, viewable by a user of the computing device. Display device 418 may be built into the computing device or provided as a separate component, externally connected to the computing device. Computer system 100 also comprises a network interface device 117 utilized to connect computer system 100 to another computer system and/or computer network (not shown).

Located within memory 420 and executed on processor 410 are a number of software components, including operating system (O/S) 430 and a plurality of software applications 435. According to the illustrative embodiment, OS 430 and software applications 435 execute on processor 410 and provide/generate graphical user interfaces (GUIs) that are displayed as various windows to a user of computer system 400 on display device 418. The processor 410 executes various application programs 435 (e.g., word processing programs, World Wide Web (WWW) browser programs, etc.), as well as the window-based OS (e.g., Microsoft Windows®, a trademark of Microsoft Corporation) that supports the application programs. The OS 430 includes an application program interface (API) that the applications utilize to invoke various OS services such as opening, closing, and repositioning of the application's windows. The OS 430 also includes a user interface, or shell, for processing user input. During operation, the application programs and the operating system exchange various messages.

The OS 430 enables the windowing functionality by which the GUIs generated by the OS and/or the applications 435 are displayed on a display screen (of the display device 418). In one embodiment, the GUIs are display via the windowing functionality of Microsoft Windows®. In the illustrative embodiment, the functionality of a window flowing utility 437 is programmed into the OS 430 and enables the OS 430 to provide the various window flowing features described herein. In an alternate embodiment, the functionality of the window flowing utility 437 is provided as a separate, add-on (off-the-market) software application that enhances the existing OS 430 to provide the window flowing features.

Further, window flowing functionality may be turned on or off during set up or installation of the OS, during set-up or installation of a particular windows application, or manually by the user post set-up or installation of either of these software. In the manual setup, the user may load or execute the window flowing utility, which generates a prompt to the user requesting the user select to turn on window flowing or turn off window flowing. Also, not al applications may be supported by window flowing, since some applications may need to be displayed in standard shaped windows (e.g., video stream of content).

It is noted that, while the illustrative embodiment of the invention is described with specific reference to a computer-executed process via the window flowing utility, the functionality associated with the invention is not necessarily limited to implementation with a utility specifically named as "window flowing" as long as the functionality of window flowing is provided by the computer system via some software control. Thus, window flowing may be programmed into an individual application that triggers the OS to enable windows associated with that application to flow/wrap around existing windows being displayed to maximize use of available areas on the display screen.

To enable display functionality, computer system also comprises a graphics subsystem 440, which includes a graphics processor 442 and graphics memory 444. Graphics memory 444 includes a display memory 446 (e.g., a frame buffer) used for storing pixel data for each pixel of display device 418. Pixel data can be provided to display memory 444 directly from CPU 410. Alternatively, CPU 410 may provide graphics processor 442 with geometry data from which graphics processor 442 generates pixel data. The pixel data is periodically scanned out from display memory 444 and displayed on display device 418.

In one embodiment, the hardware components of computer system 400 are of generally conventional design. Computer system 400 may also include other components (not shown) such as fixed disk drives, removable disk drives, CD and/or DVD drives, audio components, modems, network interface components, and the like. It will therefore be appreciated that the system described herein is illustrative and that variations and modifications are possible. Further, the techniques for providing window flowing described herein may also be implemented in a variety of computer systems and managed by a graphics processor, within the CPU, or in other components of the computer system.

Also, while the invention is described as being implemented in a computer system 100, those skilled in the art appreciate that various different configurations of computer systems exists and that the features of the invention are applicable regardless of the actual configuration of the computer system so long as the computer system supports window flowing functionality and has a display device or other output device on which multiple windows may be concurrently displayed/presented accordingly. Notably, printed output of screen shots may also provide the specific window flowing orientation. Further, the invention is applicable to not only a full computer system but may also be implemented in a portable and/or hand held device such as a personal digital assistant (PDA), cell phone, or other hand-held devices, as well as within larger mainframe type devices so long as the device has a display and supports windowing.

Figure 1:
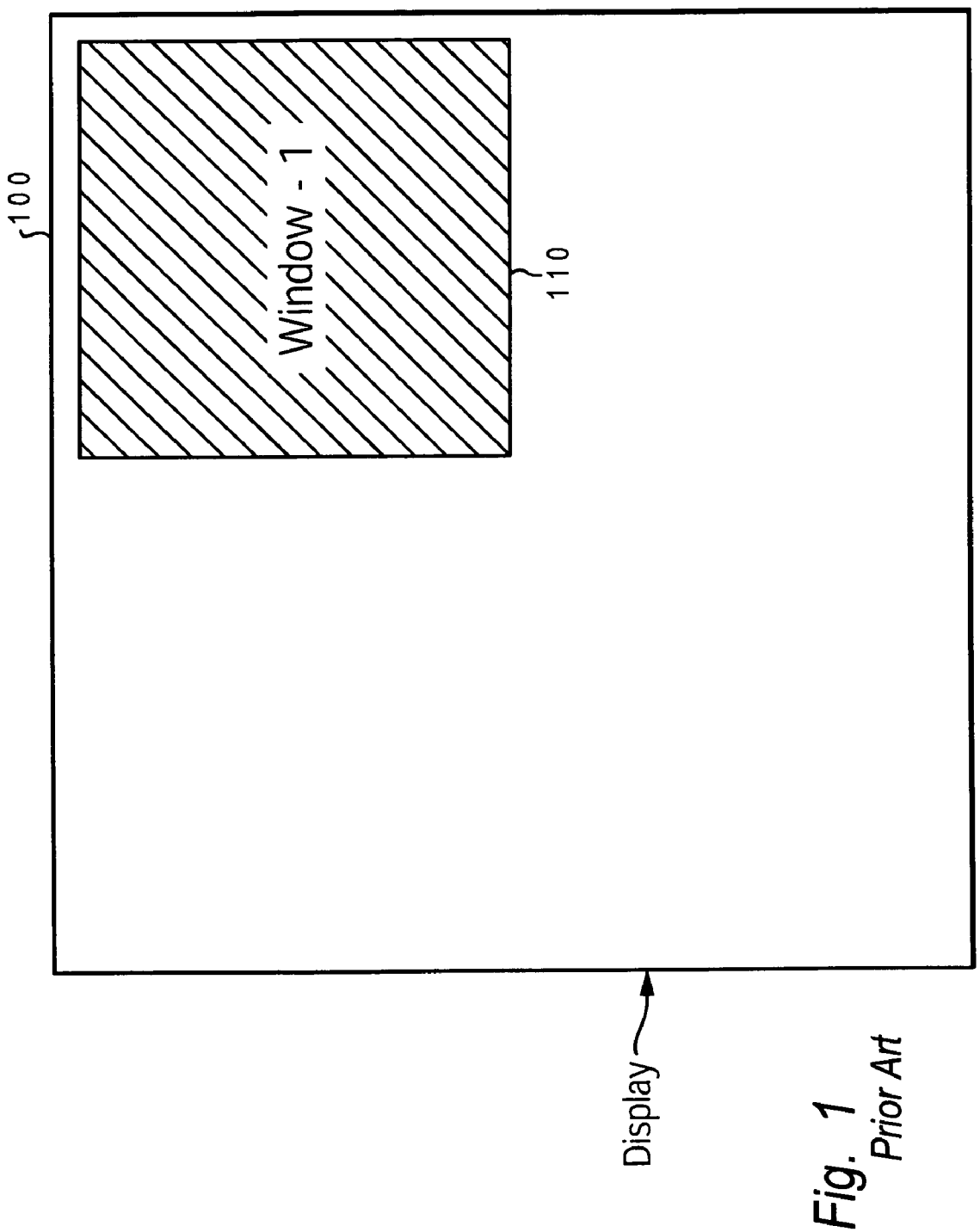
FIG. 1 is a block diagram representation of a display device with a display area having a single persistent window.

FIG. 1 illustrates a display screen 105 in which a single first window, window1 110 is displayed. Display screen 100 has a large amount of available space, which is contiguous, around window1 110. For purposes of illustration and description of the invention, window1 110 is assumed to be persistently displayed on display screen 105, regardless of what other windows may be opened on the display screen. Also, window1 110 is assumed to have a preset size and shape, with dimensions that are less than the vertical or horizontal dimensions of display screen 105. Although window1 110 is illustrated as rectangular, the functional features of the invention may be applied to a different shaped first window (e.g., a round window1), in other embodiments. Further, while window1 110 is illustrated as occupying the top right corner of the available display space, other embodiments of the invention are provided below in which window1 110 occupies a different location within display space.

Figure 2A:
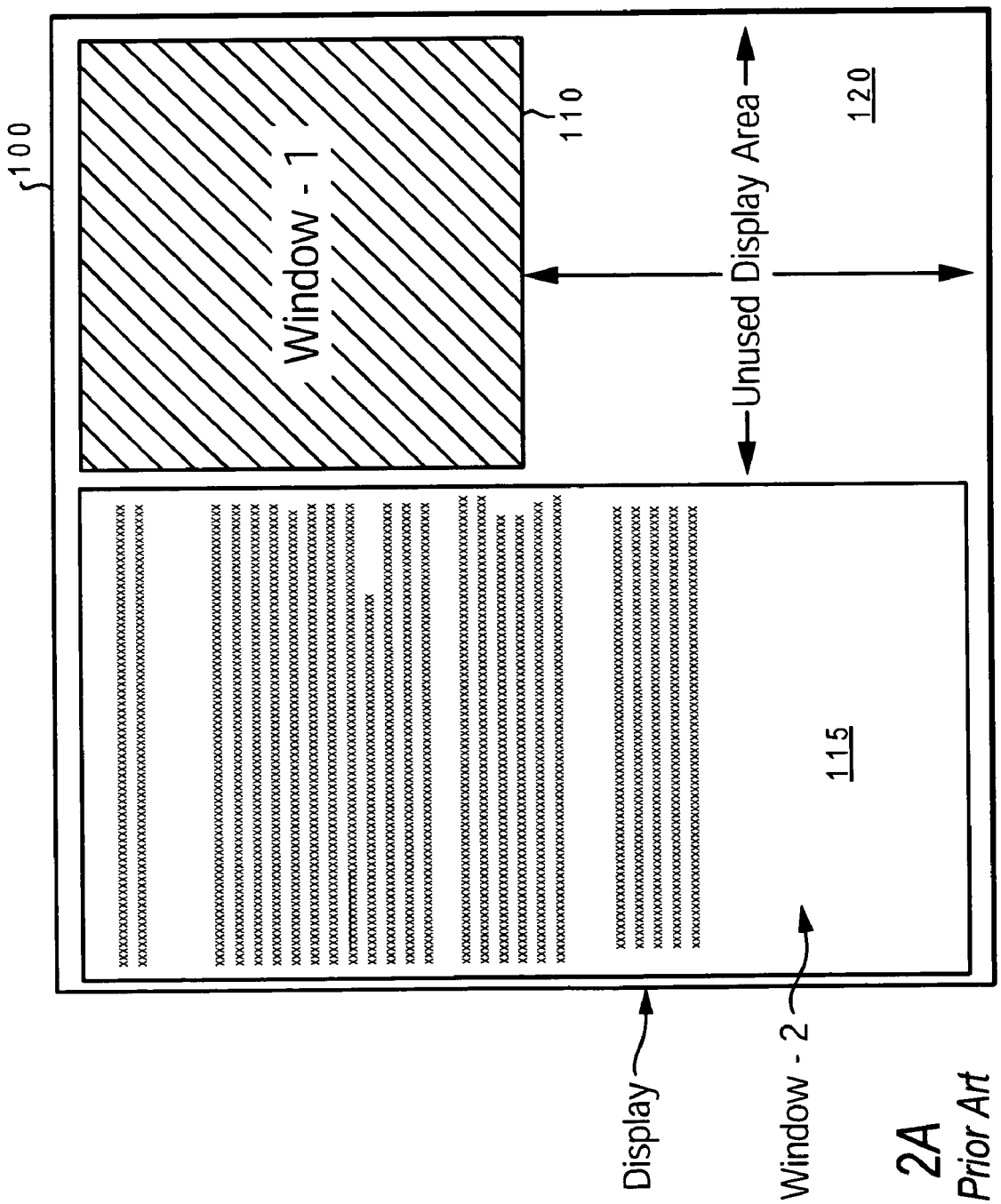
FIGS. 2A and 2B are block diagram representations of a display device with a display area having the persistent window and a second open window after selection of the "arrange all" option from the application program menu or manual adjustments by a user, according to the prior art.
Figure 2B:
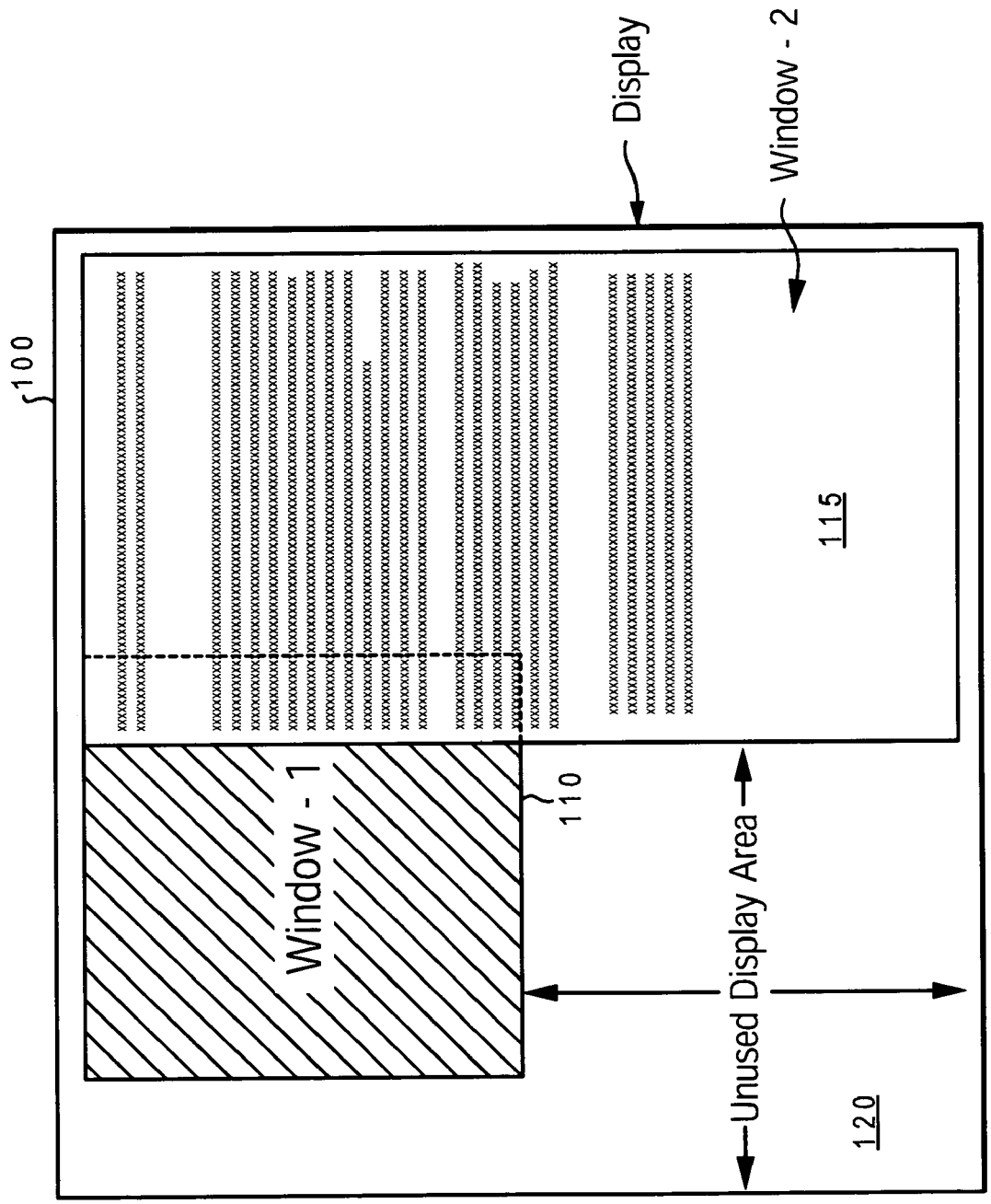

FIGS. 2A-2B illustrate conventional handling of concurrently displaying multiple windows within the display device when the windows do not completely fill the available display area of the display device. When a second window, window2 115, is opened, as shown by FIGS. 2A-2B, window2 115 opens alongside window1 110 with its own (different) dimensions. This conventional method enables both windows to be displayed without overlap of the window edges (or larger portions) within the display screen. As shown, the two adjacent windows maintain their respective dimensions (typically square or rectangular), and there is some available space below window1 110 that is not being utilized by either window. Notably, FIG. 2B illustrates another conventional display scenario, where the two windows overlap at some point even though there is available space below window1 110.

For illustrative purposes and to more clearly explain the invention, window1 110 is assumed to be a window that is to remain open as a viewable window on the display screen regardless of which other windows are opened. Thus, as illustrated by the conventional implementations, when it is desirable for the contents of a first window to always be visible (e.g., a video stream), any subsequent window that is open must not overlap that window. Also, if the first window only occupies a small portion of the display space relative to the second window, there may be an unused display area extending from one or more of the perimeter edges of the first window to the exterior edges of the display screen. By implementing the window flowing features of the illustrative embodiment of the invention, the unused portions of the display screen is occupied by the second window, and the usage of the display area is substantially maximized.

According to one embodiment, the OS function that controls opening of windows within the display space determines the display area not being utilized by a first open window and then the OS function creates an irregular-shaped second window that flows around the first window into the unused area of the display space. The window flowing of the second window then maximizes the amount of display area utilized by the second window while the first window remains visible.

Figure 3A:
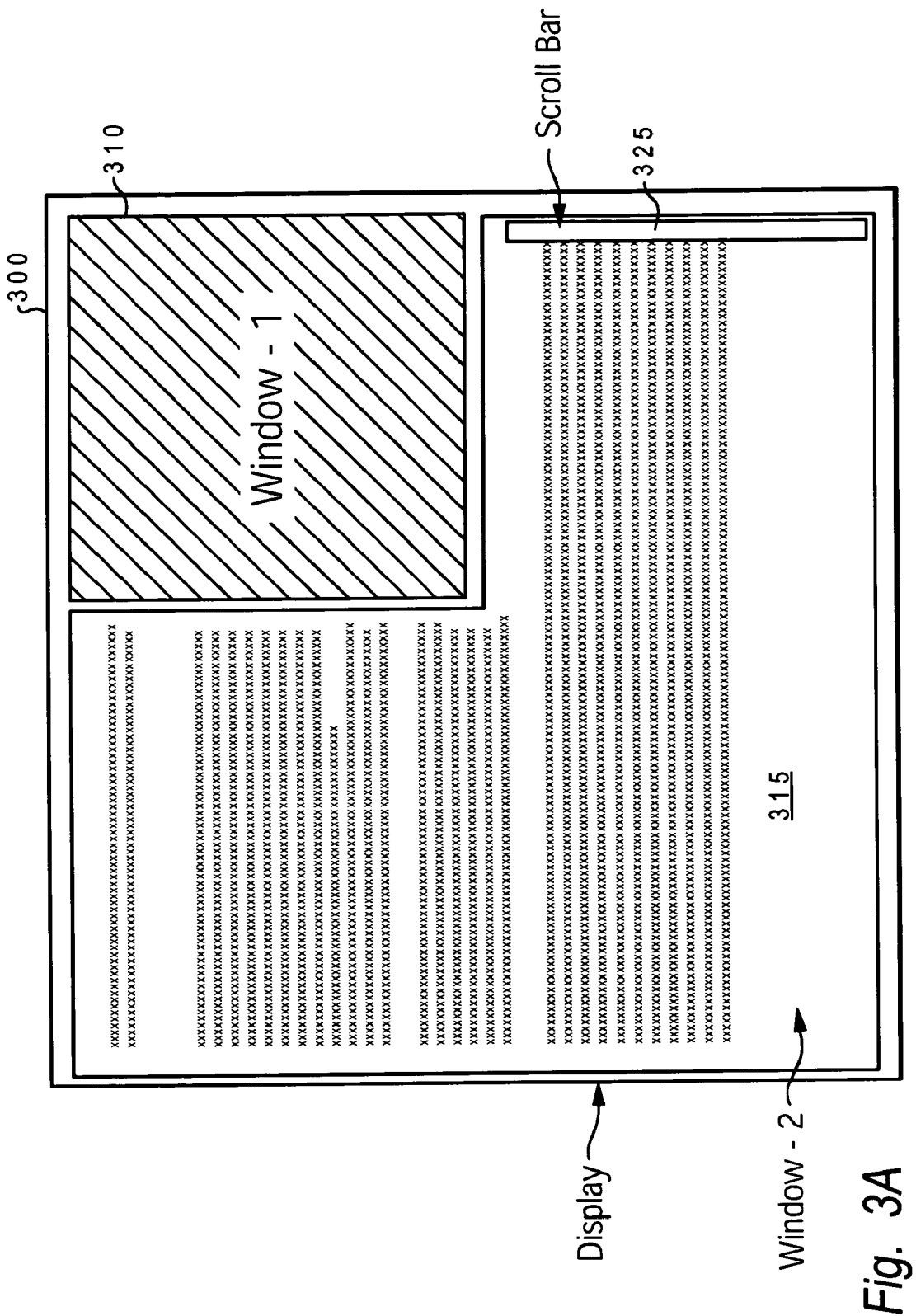
FIGS. 3A and 3B are block diagram representations of two windows displayed within the display screen using window flowing techniques according to embodiments of the present invention.
Figure 3B:
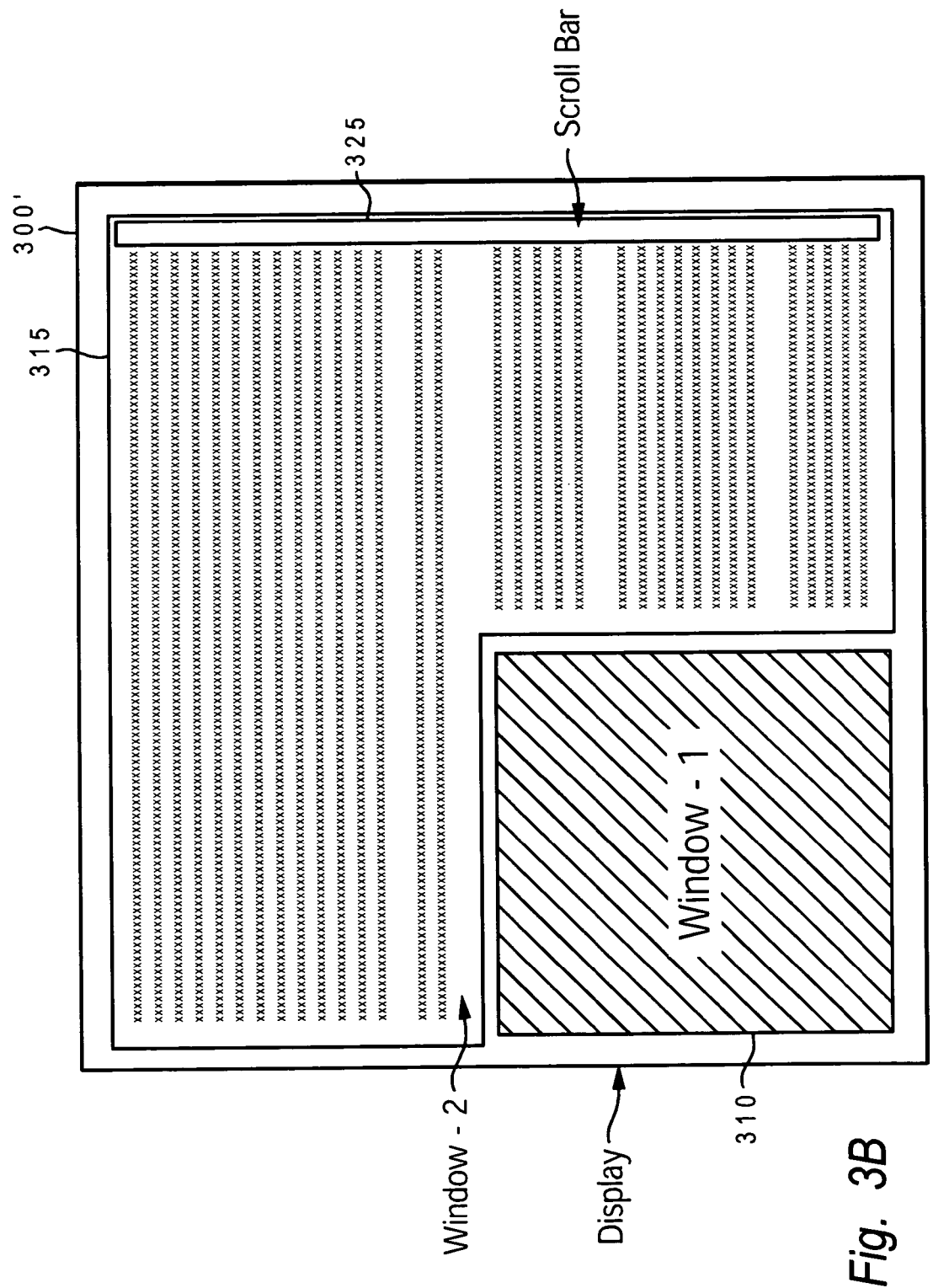

The illustrative embodiment provides at least two different (of multiple) window flowing orientations that may be implemented by the window flowing utility. FIG. 3A illustrates horizontal window flowing, while FIG. 3B illustrates vertical window flowing. As shown by FIG. 3A, primary portion of window2 315 is oriented vertically along the left side of window1 110 while extended portion is oriented horizontally below window1 310. The scroll bar 325 is situated in a mid-vertical orientation to enable the user to scroll down or up the page, despite the window's odd/irregular shape. FIG. 3B, however, displays window2 315 horizontally above window1 310 and oriented vertically along the right side of window1 110. Since the entire right side of the display space is available to window2 315, the scroll bar 325 is situated in a full-vertical orientation from the top to the bottom of the display screen. If window2 315 is displaying text, fox example, the text is wrapped around the image of window1 310 somewhat similarly to a newspaper article oriented around pictures/images/other articles on a page.

The window flowing configuration illustrated may be referred to as an L flow and reversed L flow because window2 makes an L shape and a reversed L shape around window1. Similarly, other types of window flowing configurations are possible, including for example, but without limitation the following: an upside-down L flow, a reversed, upside-down L flow, a doughnut flow (for window1 is circular and oriented in the center of the screen), a square doughnut flow, a rectangular doughnut flow, etc. Thus, while only two orientations are illustrated, it is understood that various other orientations of the windows relative to each other are possible. It is also understood that the window flowing features is applicable to display of more than two windows, with two windows being utilized herein solely to simplify the description of the core functional features.

Figure 5:
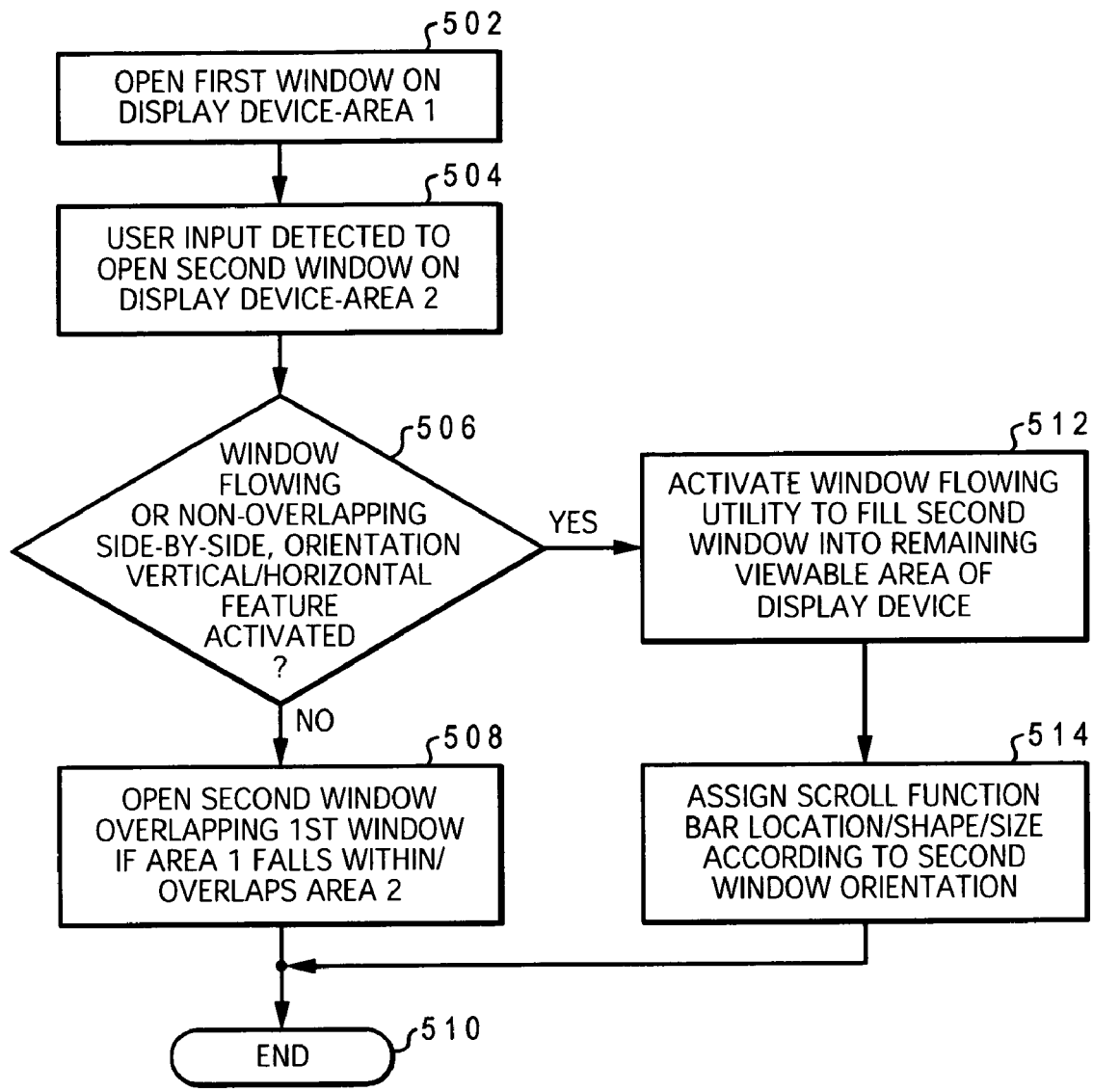
FIG. 5 is a flow chart of the processes that enable implementation of window flowing of a second open window into the display area, according to the one embodiment of the invention.

Turning now to FIG. 5, which provides a flow chart of the process by which the window flowing features are implemented according to one embodiment. The process begins at block 502, which shows a user opening a first persistent window (window1), which occupies a first location/area on the display screen and is not overlaid by other windows opened on the display screen. The window flowing utility then detects the opening of a second window (window2) (via an input from a user or application) at block 504. A determination is then made at block 506 whether window flowing features is activated. The activation of window flowing may be via (1) user selection during set-up of the operating system; (2) user selection during set-up of the application; (3) user selection post-opening of the window via a pull down menu or other selection process; and (4) automatic loading of the utility into the OS during installation on the computer system.

If window flowing feature is activated/enabled or window1 is open in a persistent state on the display screen such that the available area is not a custom (square or rectangular) shape, the window flowing feature is automatically triggered at block 512 to open the second window to fill in the available contiguous area of the display space. Then the scroll bar is assigned based on the resulting shape of the second window as shown at block 514.

Returning to block 506, if window flowing feature is not activated, and window1 is not in a persistent state, window2 is opened within a rectangular/square shaped area without flowing into spaces around the first window, as indicated at block 508. Depending on the size of window2, window2 may overlap all or portions of window1. Then the process ends at block 510.

While described as the second opened window flowing into the available/remaining space on the display device, one embodiment of the invention provides the flowing of the first window when the second window is the window requiring a persistent presence on the display device (or a window whose shape cannot or should not be re-oriented). This embodiment also assumes that the first window has no such restrictions with respect to shape/size.

The above embodiments assumes the OS automatically configures the window flowing and/or the user of the computer system pre-sets the window flowing functionality, either prior to or after selecting the second window. In one alternate embodiment, the window flowing utility enhances the windowing functions performed by the OS by providing windows with flow handles that allow the user to manually flow (drag) the window into unused/available contiguous display area(s).

Figure 6B:
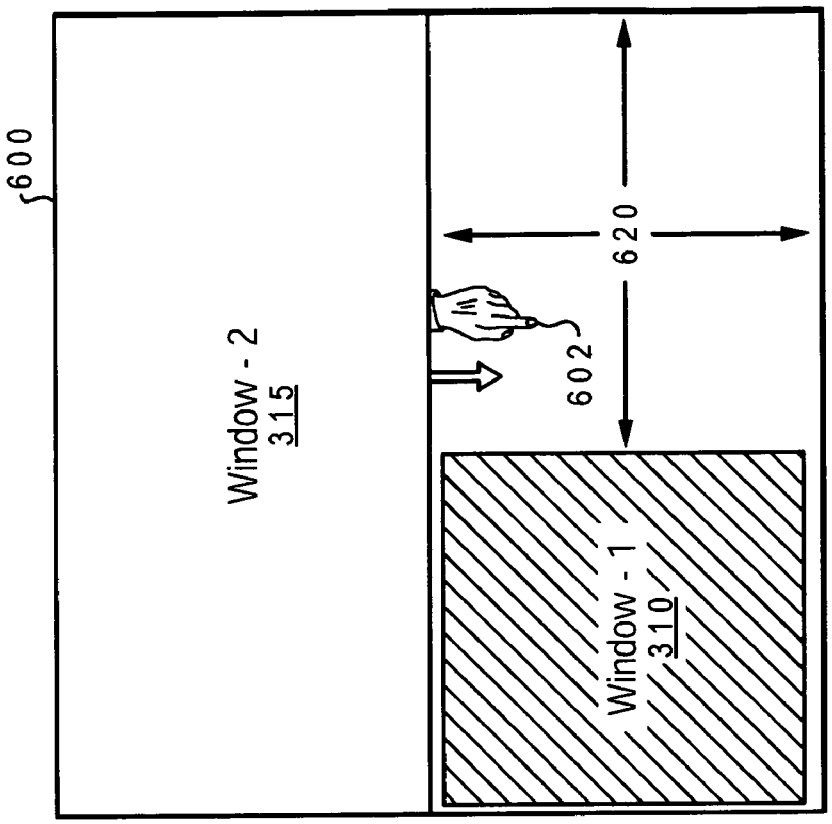
FIGS. 6A and 6B are block diagram representations of two windows displayed within the display screen with one window having a flow control handle that enables user-manipulation of the flow design of the window, in accordance with embodiments of the invention.
Figure 6A:
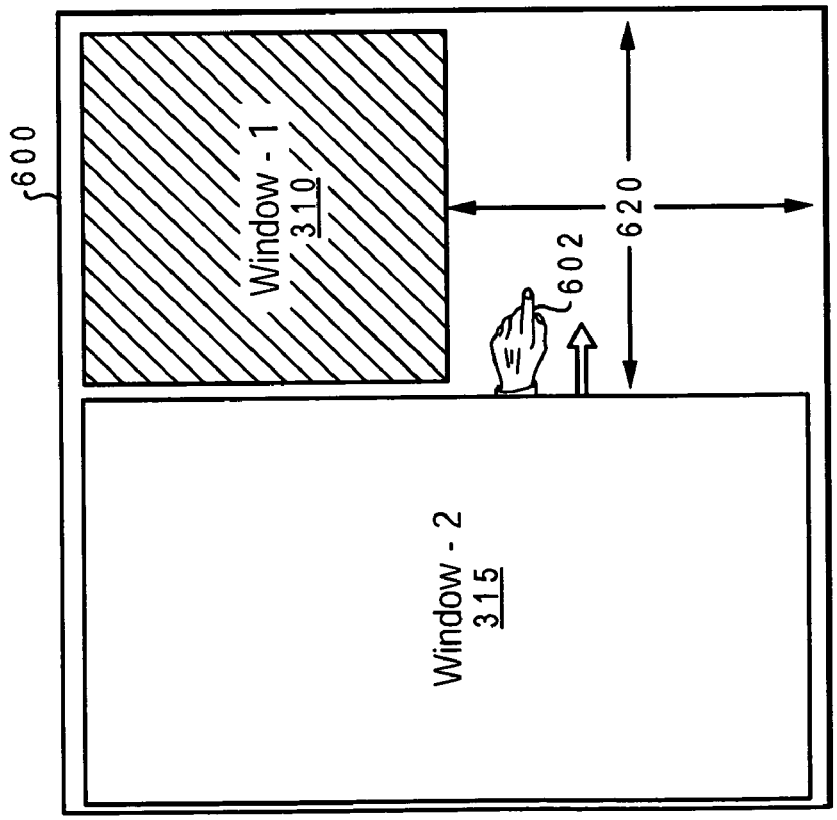

As shown by FIG. 6A-6B, window2 has a flow handle 602 (shown as similar to a grab handle of a PDF document) that may be grabbed and pull in one of two possible horizontal directions by a user. The flow handle 602 is provided at the appropriate edge of the window depending on the location of the unused space relative to window2 315. FIG. 6A illustrates window2 315 before the user drags the side of the window horizontally across the available display space 620. FIG. 3A then shows window2 315 with the bottom portion flowing across the bottom of window1 310. FIG. 6B then illustrates window2 315 before the user drags the bottom of the window vertically down the available display space 620.

Figure 7:
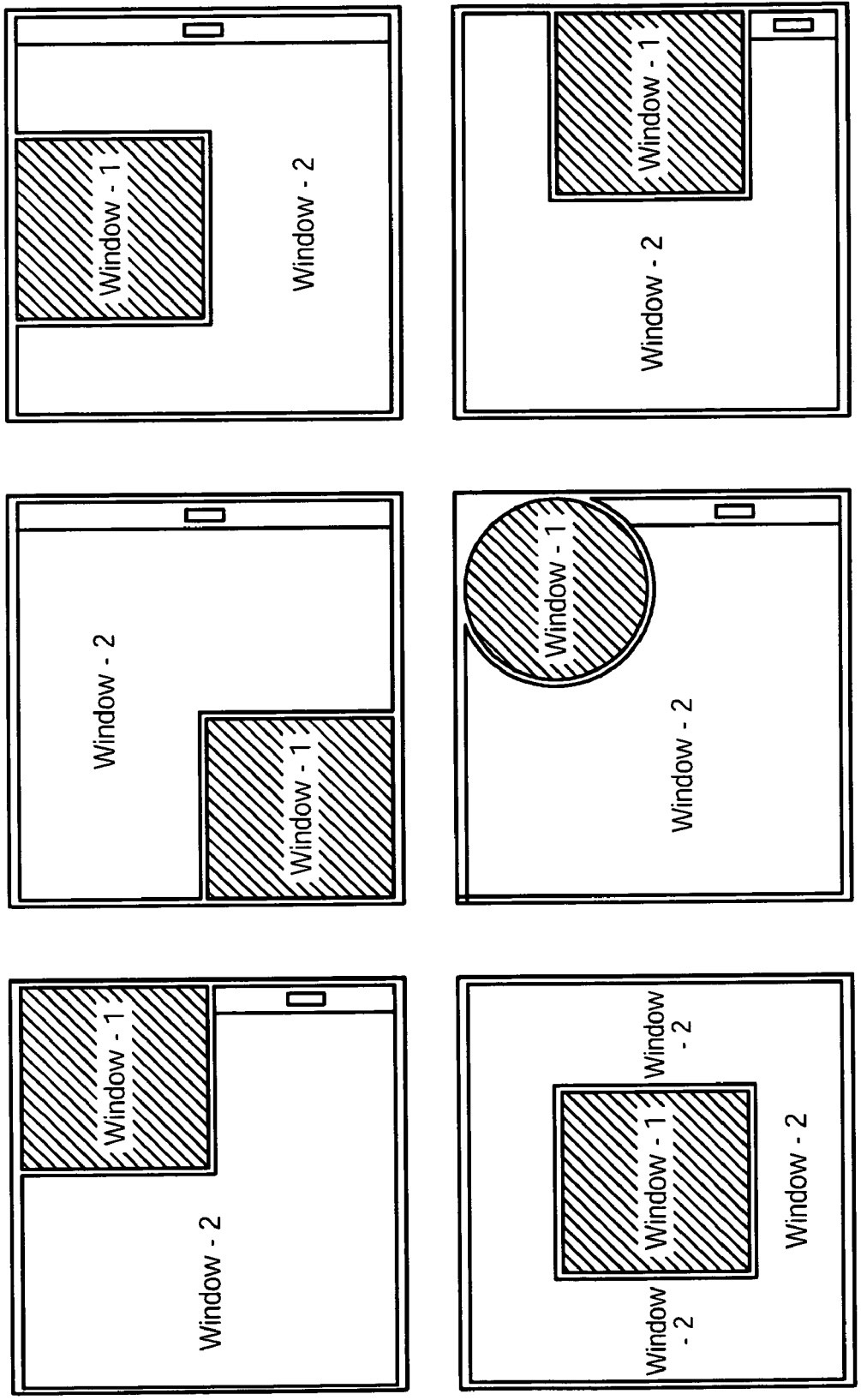
FIG. 7 illustrates a series of possible window flowing configurations for two open windows, with a first persistent window according to embodiments of the invention.

Because the first persistent window may be located at any of a plurality of positions/locations within the display screen, different embodiments of the invention support different configurations of the second window via window flowing. In each alternate embodiment, the second window is irregularly shaped (i.e., not square or rectangular shaped). Several of these different configurations are illustrated by FIG. 7. As shown, for example, when the first window has a rectangular or square shape and is position against one of the edges of the display screen, the available space (and thus the second window) may be either forward or reversed, right-side up or upside-down L shaped. When the first window is positioned in the center of the display area, the available space may be a round or square doughnut shape, or one of a U shape, upside down or sideways U shape. Other configurations of the second window are possible based on the location of the first window, the shape of the available contiguous space, the type of information being displayed in the second window, and other factors. A second window displaying text, for example, would best be represented as an L-shaped window rather than a doughnut shaped (or even a U shaped) window. As a logical extension of the U shaped design, one embodiment of the invention enables the second window to be represented by two non-contiguous sub-windows, each providing a different portion of the content of the second window.

The invention finds applicability in typical windowing environments and applications that provide windows to display files/documents, etc. The invention is also applicable to web browsers, where a user may require multiple browsers be simultaneously open on the display screen. A window displaying streaming video content may be an example of a window that is desired to remain in a persistent state on the display screen. Such windows are often smaller in size than the available area of the display screen. Users are thus able to maximize the use of the display screen while ensuring that the persistent window remains open and viewable on the display screen. User activated second windows may also be made to flow into available space when the main window remains open on the display screen. For example, an email inbox would remain visible while the content of an individual email is opened in another location of the display screen rather than over the email inbox. These are other applications of the invention are supported by the present invention.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
generating a first window that persistently occupies a set, first space of a total output space, said first space having first and second linear dimensions that are less than the corresponding linear dimensions of the total output space, wherein a remaining, available output space is irregularly shaped;
configuring a second window to occupy the remaining, available output space, wherein the second window is irregularly shaped relative to a standard rectangular window shaped, wherein said configuring configures said second window to occupy one of: (a) an L-shaped space, wherein a particular position of the L is dependent on the location of the first window within the display space; and (b) the available space without overlapping the first window;
wherein the output space is the space on a display screen of the data processing system, and said method further comprises: displaying the first window on the display screen, said first window persistently occupying a first space on the display screen, which first space area has first and second linear dimensions that are less than the similarly-oriented, corresponding linear dimensions of the display screen; and displaying the second window in a second area of the display screen, wherein the second area corresponds to a contiguous portion of the available output space on the display screen with a first portion of the contiguous portion extending in the first linear dimension adjacent to the first window and a second portion of the contiguous portion extending in the second linear dimension adjacent to the second window;

providing a vertical scroll bar within the second window that extends only to an edge of the second window that is positioned along the right edge of the display screen;

enabling vertical scrolling of the content utilizing the vertical scroll bar, wherein when the vertical scroll bar is shorter than the linear vertical dimension of the display screen, a portion of the vertically scrolled content moves up into an area of the second widow that is not adjacent to the right edge of the display screen;

said first window is opened subsequent to the second window, and the method comprises, responsive to a placement of the first window in an area of the display screen currently occupied by the second window, dynamically displacing the second window to occupy the remaining space around the area in which the first window is placed;

determining, prior to configuring said second window, if window-flowing functionality is activated within a window generating system;

when the window flowing functionality is activated, dynamically performing said configuring step; and when the window flowing functionality is not activated, enabling a user to select whether the second window should flow into the available space, wherein said enabling includes:

displaying the second window with a standard shape and dimension;

providing a selectable feature for enabling the second window to be reconfigured to occupy the remaining available space of the display space, wherein the selectable feature is a flow handle, and wherein the flow handle is provided in at least one the direction in which the window may be reconfigured, and the method includes: enabling user-selection and dragging of the flow handle; and automatically reconfiguring a border of the window corresponding to the location of the flow handle to move into and out of the available space depending on the direction in which the user moves the flow handle; and when the user selects the selectable feature, automatically reconfiguring the second window to occupy the remaining available space, wherein the second window is reconfigured into the irregular shaped window.

* * * * *